United States Patent
Genoud et al.

(10) Patent No.: US 12,311,316 B2
(45) Date of Patent: May 27, 2025

(54) METHOD OF SELECTIVELY CATALYTICALLY REDUCING DINITROGEN OXIDE, A METHOD OF EXTRACTING CARBON DIOXIDE, A METHOD OF DETECTING CARBON DIOXIDE, AN APPARATUS, AND USE

(71) Applicant: Teknologian tutkimuskeskus VTT Oy, Espoo (FI)

(72) Inventors: Guillaume Genoud, Espoo (FI); Matti Reinikainen, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 192 days.

(21) Appl. No.: 18/022,184

(22) PCT Filed: Aug. 19, 2021

(86) PCT No.: PCT/FI2021/050562
§ 371 (c)(1),
(2) Date: Feb. 20, 2023

(87) PCT Pub. No.: WO2022/038317
PCT Pub. Date: Feb. 24, 2022

(65) Prior Publication Data
US 2024/0033686 A1     Feb. 1, 2024

(30) Foreign Application Priority Data
Aug. 19, 2020   (FI) .................................. 20205806

(51) Int. Cl.
*B01D 53/86* (2006.01)
*B01D 8/00* (2006.01)
(Continued)

(52) U.S. Cl.
CPC ........... *B01D 53/8628* (2013.01); *B01D 8/00* (2013.01); *B01D 53/04* (2013.01); *G01N 1/34* (2013.01);
(Continued)

(58) Field of Classification Search
CPC .... B01D 2253/206; B01D 2255/20761; B01D 2255/70; B01D 2256/22; B01D 2257/402;
(Continued)

(56) References Cited

U.S. PATENT DOCUMENTS

| | | |
|---|---|---|
| 2004/0192538 A1 | 9/2004 | Hamon et al. |
| 2018/0052047 A1 | 2/2018 | Iguchi et al. |
| 2020/0203916 A1 | 6/2020 | Iguchi et al. |

FOREIGN PATENT DOCUMENTS

| | | | | |
|---|---|---|---|---|
| EP | 2724769 A1 * | 4/2014 | ........... | B01D 53/565 |
| FI | 128319 B | 3/2020 | | |

(Continued)

OTHER PUBLICATIONS

Dudziak et al: Purification of carbon dioxide from N2O for mass-spectrometrical analysis of soil CO2. Appl. Radiat. Isot., 1990, vol. 41, No. 9, pp. 909-911.

*Primary Examiner* — Kathryn Elizabeth Limbaugh
(74) *Attorney, Agent, or Firm* — Laine IP Oy

(57) ABSTRACT

According to an example aspect of the present invention, there is provided a method of selectively catalytically reducing dinitrogen oxide present in a gaseous sample, comprising: providing a catalyst capable of reducing dinitrogen oxide; bringing the gaseous sample into contact with the catalyst to reduce dinitrogen oxide in the gaseous sample in the presence of the catalyst; wherein as a result of the reduction step, the gaseous sample is adapted for determination of the amount of an isotopic form of $CO_2$ in the gaseous sample.

14 Claims, 4 Drawing Sheets

(51) Int. Cl.
   *B01D 53/04*     (2006.01)
   *G01N 1/34*      (2006.01)
   *G01N 21/3504*   (2014.01)

(52) U.S. Cl.
   CPC ... *G01N 21/3504* (2013.01); *B01D 2253/206* (2013.01); *B01D 2255/20761* (2013.01); *B01D 2255/70* (2013.01); *B01D 2256/22* (2013.01); *B01D 2257/402* (2013.01)

(58) Field of Classification Search
   CPC .... B01D 53/04; B01D 53/8628; B01D 53/86; B01D 53/9413; B01D 53/9427; B01D 8/00; B01D 59/00; B01J 21/18; B01J 23/72; G01N 21/3504; G01N 21/35; G01N 33/0037; G01N 3533/004; Y02C 20/10
   See application file for complete search history.

(56) References Cited

FOREIGN PATENT DOCUMENTS

| WO | WO-2008061210 A2 * | 5/2008 | ......... B01D 53/1418 |
|----|--------------------|--------|------------------------|
| WO | WO2008142765 A1    | 11/2008 | |
| WO | WO2020065133 A1    | 4/2020 | |
| WO | WO-2020141250 A1 * | 7/2020 | ............... B01D 1/14 |

* cited by examiner

METHOD OF SELECTIVELY CATALYTICALLY REDUCING DINITROGEN OXIDE, A METHOD OF EXTRACTING CARBON DIOXIDE, A METHOD OF DETECTING CARBON DIOXIDE, AN APPARATUS, AND USE

FIELD

The invention concerns a method of selectively removing trace amounts of $N_2O$ from gaseous samples by using catalytic reduction.

BACKGROUND

Carbon has two stable isotopes and an unstable isotope, carbon-14 also called radiocarbon (C-14). It is present in trace amounts on Earth, with an abundance compared to the main carbon isotope ($^{14}C/^{12}C$) of 1.2 part per trillion (ppt). Radiocarbon is produced from nitrogen by thermal neutrons, either naturally in upper atmosphere or in anthropogenic nuclear reactions, e.g. nuclear power plants or past atmospheric nuclear weapon tests. It then enters the carbon cycle and is present in all modern carbon, while it has decayed to a negligible level in fossil carbon due to its half-life of 5730 years. It is therefore the ideal tracer for discriminating between emissions of fossil origin or biogenic origin, and has numerous applications. It is for instance used to monitor the biofraction in mixed fuels for carbon trade schemes, and to evaluate the contribution of fossil emissions to the global greenhouse gas emissions. C-14 is also commonly used in biomedicine to label organic compounds.

C-14 is also one of the main sources of radioactive gas emissions in nuclear facilities, and regulations require it to be monitored.

In nuclear facilities C-14 can be found in concentrations higher than its natural abundance, typically about 1 ppb to 1 ppm. All parts of nuclear power plants are potential sources for radiocarbon emissions in gaseous form, mostly in the form of carbon dioxide but also in other molecular forms such as methane. In waste repositories, for example, biodegradation of radioactive waste produces $^{14}CO_2$ emissions at levels in the range 10 ppb to 1 ppm. Such levels correspond to activity concentrations in the range 1 to 100 Bq/ml. Long-lived radioisotopes such as radiocarbon are particularly challenging to detect in the context of nuclear facilities.

An accelerator mass spectrometer is the state-of-the-art instrument for radiocarbon detection, while liquid scintillation counting is also extensively used in particular in nuclear facilities. These methods have several drawbacks. They are mainly laboratory-based thus requiring off-site sample analysis, which is a disadvantage when large numbers of samples must be analysed or real-time on-line monitoring is needed.

Radiocarbon detection using laser spectroscopy has on-site on line measurement capabilities, and in the future it can benefit many applications in the fields of nuclear safety, biomedicine, and environmental monitoring. This optical technique relies on the detection of absorption lines of $^{14}CO_2$ by using mid-infrared laser spectroscopy.

$N_2O$ is present in trace amounts (about 330 ppb) in the atmosphere but it has strong absorption lines in the 4.0 to 4.5 microns wavelength region. In laser spectroscopy applications, these absorption lines can interfere with the measurement and thus reduce the sensitivity, in particular in applications that rely on radiocarbon detection in the form of carbon dioxide, because absorption lines in the same wavelength region are used for its detection. Strong $N_2O$ absorption lines are present close to $^{14}CO_2$ absorption lines that are used for radiocarbon detection. It is therefore necessary to remove $N_2O$ in order to achieve the highest possible sensitivity.

Detection of radiocarbon dioxide by infrared laser spectroscopy has been experimented in the prior art.

G. Genoud et al., "Radiocarbon dioxide detection based on cavity ring-down spectroscopy and a quantum cascade laser", *Optics Letters* 40 (2015) 1342-1345, describes the use of cavity ring-down spectroscopy and a quantum cascade laser for monitoring radiocarbon ($^{14}C$) in carbon dioxide.

McCartt, T. Ognibene, G. Bench, and K. Turteltaub, *Nucl. Instr. Meth. Phys. Res. B* 361 (2015) 277, relates to measurements of carbon-14 with cavity ring-down spectroscopy.

In Galli, I.; Bartalini, S.; Borri, S.; Cancio, P.; Mazzotti, D.; De Natale, P.; Giusfredi, G. *Phys. Rev. Lett.* 2011, 107, 270802, radiocarbon concentrations are measured by using saturated-absorption cavity ringdown spectroscopy.

Galli, I.; Bartalini, S.; Ballerini, R.; Barucci, M.; Cancio, P.; De Pas, M.; Giusfredi, G.; Mazzotti, D.; Akikusa, N.; De Natale, P. *Optica* 2016, 3, 385, describes a compact spectroscopic apparatus, based on saturated-absorption cavity ring-down, for measuring radiocarbon dioxide concentration.

McCartt, A. D.; Ognibene, T. J.; Bench, G.; Turteltaub, K. W. *Anal. Chem.* 2016, 88, 8714, relates to quantifying carbon-14 for biology using cavity ring-down spectroscopy.

Fleisher, A. J.; Long, D. A.; Liu, Q.; Gameson, L.; Hodges, J. T. J. *Phys. Chem. Lett.* 2017, 8, 4550, describes optical measurement of radiocarbon below unity fraction modern by linear absorption spectroscopy.

Sonnenschein, V.; Terabayashi, R.; Tomita, H.; Kato, S. Hayashi, N.; Takeda, S.; Jin, L.; Yamanaka, M.; Nishizawa, N.; Sato, A. Yoshida, K.; Iguchi, T. J. *Appl. Phys.* 2018, 124, 033101, relates to a compact cavity ring-down spectrometer aimed at the detection of trace amounts of radiocarbon in biomedical samples.

Various catalysts for converting $N_2O$ have been proposed. Typically, catalytic conversion takes place via a decomposition reaction.

In Hong Meng et al., "Reductive removal of gaseous nitrous oxide by activated carbon with metal oxide catalysts", *RSC Adv.*, 2017, 7, 10407, the performances of Cu-containing activated carbon were studied at varying gas flow rates, Cu contents, and calcination temperatures. $N_2O$ was removed from a gas mixture comprising $N_2O$ and Na.

In S. Kannan, "Decomposition of nitrous oxide over the catalysts derived from hydrotalcite-like compounds", *Applied Clay Science* 13 (1998) 347-362, catalytic decomposition of nitrous oxide into nitrogen and oxygen has been carried out on 'in situ' thermally calcined hydrotalcites.

M. Konsolakis, "Recent Advances on Nitrous Oxide ($N_2O$) Decomposition over Non-Noble-Metal Oxide Catalysts: Catalytic Performance, Mechanistic Considerations, and Surface Chemistry Aspects", *ACS Catal.* 2015, 5, 6397-6421, provides a review of catalytic decomposition of $N_2O$.

Removal of $N_2O$ via a catalytic oxidation reaction has been described in WO2020065133A1 and in G. Genoud et al., "Laser Spectroscopy for Monitoring of Radiocarbon in Atmospheric Samples", *Anal. Chem.* 2019, 91, 12315-12320.

There is a need for developing a sensitive method for the detection of isotopic forms of carbon in various molecular forms, particularly in the form of carbon dioxide.

There is a further need for providing an online and onsite method for monitoring radiocarbon.

There is a need of being able to perform those measurements in the presence of trace amount of $N_2O$, for example when analysing atmospheric samples.

The embodiments of the present invention are intended to overcome at least some of the above discussed disadvantages and restrictions of the prior art.

SUMMARY OF THE INVENTION

The invention is defined by the features of the independent claims. Some specific embodiments are defined in the dependent claims.

According to a first aspect of the present invention, there is provided a method of selectively catalytically reducing dinitrogen oxide present in a gaseous sample, comprising: providing a catalyst capable of reducing dinitrogen oxide; bringing the gaseous sample into contact with the catalyst to reduce dinitrogen oxide in the gaseous sample in the presence of the catalyst; wherein as a result of the reduction step, the gaseous sample is adapted for determination of the amount of an isotopic form of $CO_2$ in the gaseous sample.

Various embodiments of the first aspect may comprise at least one feature from the following bulleted list:
  The gaseous sample also comprises carbon dioxide.
  The catalyst is not capable of reducing said carbon dioxide.
  The catalyst is a heterogeneous Cu catalyst.
  The catalyst is a heterogeneous calcined hydrotalcite catalyst.
  The catalyst is a heterogeneous catalyst comprising Cu on activated carbon.
  The method comprises heating the catalyst, and bringing the gaseous sample into contact with the heated catalyst to reduce dinitrogen oxide in the gaseous sample in the presence of the heated catalyst.
  The catalyst is heated to a temperature of at least 200° C., preferably to a temperature in the range from 200 to 500° C.
  The untreated gaseous sample comprises at least 90 vol-% carbon dioxide.
  The catalytic reaction is carried out without any addition or feed of external gases.
  Said isotopic form of carbon dioxide is $^{14}CO_2$.
  Said determination is carried out by infrared absorption laser spectroscopy.

According to a second aspect of the present invention, there is provided a method of extracting carbon dioxide from a gaseous sample, comprising: concentrating the gaseous sample to increase the concentration of carbon dioxide, to obtain a concentrated gaseous sample; and thereafter bringing the concentrated gaseous sample into contact with a catalyst capable of reducing dinitrogen oxide, in order to remove any dinitrogen oxide in the concentrated gaseous sample, to form $N_2$ and $O_2$ as reaction products of the reduction reaction.

Various embodiments of the second aspect may comprise at least one feature from the following bulleted list:
  Said catalyst is a heated catalyst.

According to a third aspect of the present invention, there is provided a method of detecting carbon dioxide in a gaseous sample comprising at least carbon dioxide and $N_2O$, the method comprising: catalytically reducing the dinitrogen oxide present in the gaseous sample; and subsequently determining the amount of an isotopic form of carbon dioxide in the gaseous sample, preferably by infrared absorption spectroscopy.

Various embodiments of the third aspect may comprise at least one feature from the following bulleted list:
  The method further comprising before the reduction step: concentrating the gaseous sample to increase the concentration of the isotopic form of carbon dioxide to be determined, to obtain a concentrated gaseous sample.
  The concentrated gaseous sample comprises at least 90 vol-% carbon dioxide.
  In the reducing step the catalytic reaction is carried out without any addition or feed of external gases.
  Before the determining step: the gaseous sample is led to a cryogenic trap which has been cooled to a temperature below 195 K, whereby the carbon dioxide present in the sample solidifies and becomes trapped; releasing the trapped carbon dioxide by heating the cryogenic trap to a temperature above 195 K.; whereby as a result a concentrated gaseous sample is obtained.
  Before the determining step: flowing the gaseous sample through an anion exchange resin that is capable of selectively adsorbing $CO_2$ present in the gaseous sample; releasing the adsorbed $CO_2$ from the resin, preferably by heating the resin; wherein as a result a concentrated gaseous sample is obtained.
  The anion exchange resin features primary, secondary, and/or tertiary amino groups.
  Said reduction step is carried out on said concentrated gaseous sample.
  The isotopic form is $^{14}CO_2$.
  The determining step comprises measuring an infrared absorption spectrum, preferably by using a cavity ring-down laser spectroscopy.

According to a fourth aspect of the present invention, there is provided an apparatus comprising in a cascade: first means for catalytically reducing dinitrogen oxide present in a gaseous sample; and second means for determining the amount of an isotopic form of $CO_2$ present in the gaseous sample by infrared absorption spectroscopy.

Various embodiments of the fourth aspect may comprise at least one feature from the following bulleted list:
  The first means for catalytically reducing dinitrogen oxide present in a gaseous sample comprises a first catalyst bed comprising a Cu catalyst.
  The apparatus further comprises: upstream of said first means, extraction means for concentrating the gaseous sample to increase the concentration of carbon dioxide containing the isotopic compounds to be determined.
  The extraction means comprises an anion exchange resin that is capable of selectively adsorbing $CO_2$ present in the gaseous sample.
  The anion exchange resin features primary, secondary, and/or tertiary amino groups.

According to a fifth aspect of the present invention, there is provided use of a Cu catalyst for selectively catalysing reduction of dinitrogen oxide in a gaseous sample containing $^{14}CO_2$, before detecting the $^{14}CO_2$ by infrared absorption spectroscopy.

Various embodiments of the fifth aspect may comprise at least one feature from the following bulleted list:

The reducing is carried out without feed of any external gas.

The gaseous sample originates from a nuclear power plant.

The gaseous sample is an atmospheric sample.

The gaseous sample is/originates from biofuels, such as biodiesel or biogas.

The gaseous sample is/originates from a biological sample.

The present invention provides numerous advantages.

Thus, the present method enables controlled and quantitative removal of $N_2O$ from samples containing carbon dioxide.

The present method can be applied on a concentrated gaseous sample without any need for oxygen, such as in the case of an oxidation reaction, and the present method does not lead to any dilution of the sample.

The present method improves the applicability of various carbon dioxide extraction and trapping methods, as it can reduce the amount of $N_2O$ without further diluting the sample. The present method makes it possible to use such carbon dioxide extraction and trapping methods which may trap both carbon dioxide and $N_2O$ or which may even produce $N_2O$ to the sample via side reactions during the trapping and/or releasing process.

The present method is particularly advantageous as an ultimate step to remove trace amounts of $N_2O$ before isotopic analysis of $CO_2$ samples by using laser spectroscopy.

The present method catalytically converts $N_2O$ without substantially affecting carbon dioxide concentration in the sample via undesired side reactions or dilution.

The present invention provides a sensitive spectroscopic method for detecting radiocarbon or other isotopic forms of carbon in gaseous samples. We have observed that laser spectroscopy can be successfully applied to the monitoring of radiocarbon in various molecular forms.

The invention provides several advantages in terms of size, price, and on-site measurement capabilities. The system presented here enables automated onsite and online monitoring of fugitive radiocarbon emissions in nuclear facilities.

The present invention can be applied in monitoring of radioactive emissions in nuclear facilities, in carbon dating, in biofraction measurements, and in source apportion determinations.

EMBODIMENTS

Definitions

Figure 1A:
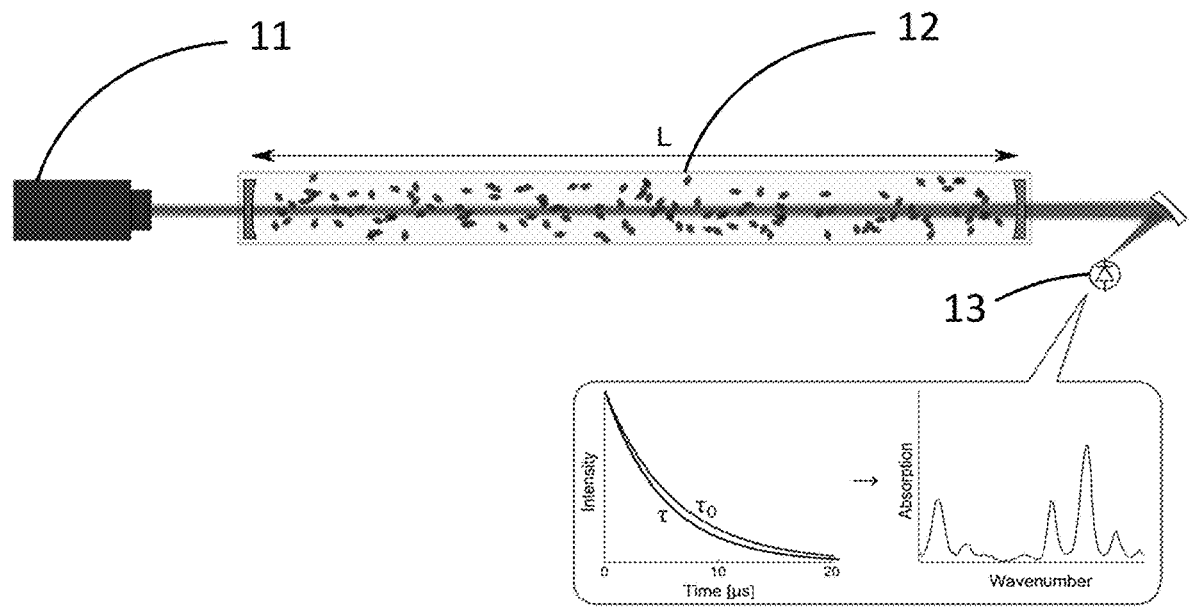
FIG. 1A illustrates schematically a laser spectroscopy apparatus.

In the present context, the term "radiocarbon" refers to $^{14}C$, the radioactive isotope of carbon.

In the present context, the term "Cu catalyst" comprises a heterogeneous catalyst comprising copper.

In the present context, the term "selective catalytic reduction of $N_2O$" refers to catalytic reduction of $N_2O$ without affecting the chemical structure of carbon dioxide.

Air samples usually contain trace amounts of $N_2O$, which has strong absorption lines close to the $CO_2$ absorption line in the mid-infrared wavelength range. In the case of detecting $^{12}CO_2$, such trace amounts would not pose any problem, because the levels of $^{12}CO_2$ in the air are in the range 400 ppm to a few %. For the purpose of monitoring ppt levels of $^{14}CO_2$, the interference from $N_2O$ significantly decreases sensitivity.

The inventors have surprisingly observed that the interference arising from $N_2O$ in laser spectroscopic radiocarbon detection methods can be successfully eliminated by a catalytic reduction reaction.

The present method is based on optical methods for the detection of molecules containing carbon isotope(s). Preferably, the detected species is an isotopologue of carbon dioxide, such as $^{14}CO_2$.

According to some embodiments of the present invention, any isotopologue of carbon dioxide can be detected, preferably selected from the unstable isotopologues of carbon dioxide, such as the unstable isotopologues containing at least one of the following: C-12, C-13, C-14, O-16, O-17, O-18.

The present invention is based on catalytic conversion and removal of $N_2O$ by means of a reduction reaction for the purpose of increasing the sensitivity of a subsequent carbon isotope detection from a gaseous sample by IR absorption spectroscopy, for example by laser spectroscopy.

In some embodiments of the present invention, an isotopic form of carbon, such as radiocarbon, present in the sample is detected in the form of carbon dioxide.

It was surprisingly observed that conversion of $N_2O$ by means of a reducing catalyst provides a significant improvement in the sensitivity of a subsequent carbon isotope determination by means of infrared spectroscopy.

$N_2O$ Removal

The invention provides a method for removal of $N_2O$ from the sample before quantifying the amount of $CO_2$ by spectroscopic means, for example by absorbance spectroscopy. $N_2O$ is converted to other molecules using a catalytic reduction reaction and a copper catalyst. The concentration of $N_2O$ that becomes directed to the spectroscopic measurement cell can be reduced in this way, thus increasing the sensitivity of laser spectroscopy for radiocarbon detection.

In a preferred embodiment, the reduction reaction is carried out immediately before isotopic analysis of carbon dioxide, such as immediately before the sample is directed to a sample cell for isotopic analysis of carbon dioxide, such as $^{14}CO_2$ analysis.

In one embodiment, the sample from which $N_2O$ has been removed by the reduction reaction, is directly, without any further $CO_2$ trapping or concentrating step, analysed by infrared absorption spectroscopy in order to determine the amount of an isotopic form of carbon dioxide.

In one embodiment, $N_2O$ is catalytically reduced by a first catalyst, which preferably is a copper catalyst, according to the following reaction:

$$2N_2O \rightarrow 2N_2 + O_2$$

The first catalyst is preferably a copper catalyst, for example a heterogeneous copper catalyst, most preferably a Cu on activated carbon catalyst. Preferably, the catalyst comprises at least 1 wt-% Cu, such as at least 5 wt-% Cu.

In another embodiment, $N_2O$ is catalytically reduced by a first catalyst, which is a calcined hydrotalcite, preferably calcined Ni hydrotalcite. An advantage of this embodiment is that a lower temperature may be used, such as a temperature of at least 190° C., for example 190 to 250° C.

In some embodiments, any catalyst capable of reducing $N_2O$ or decomposing $N_2O$ to $N_2$ and $O_2$ may be used. For example, the catalyst may be a noble-metal-supported catalyst, a metal oxide catalyst, or a zeolite-based catalyst.

Advantageously, a catalyst exhibiting a high catalytic activity at a low partial pressure is chosen.

The present copper catalyst can efficiently and selectively convert or reduce $N_2O$ without reducing carbon dioxide. Such reduction products of carbon dioxide, if produced, would seriously impair accurate detection of the $^{14}CO_2$ originally present in the sample.

In preferred embodiments, the catalytic reduction reaction is carried out without any addition or feed of external gases. The advantage is that the sample is not diluted and there is no need to place a further $CO_2$ concentrating step after the reduction step.

In one embodiment, the concentration of $CO_2$ in the sample that is directed to $N_2O$ removal by the present reduction method is at least 90 vol-%. In other words, the sample is preferably a concentrated, substantially pure carbon dioxide sample containing only trace amounts of other gases. The sample may contain less than 1 ppm of $N_2O$.

Preferably, after the reduction step, the concentration of $CO_2$ remains substantially the same or even increases, such as decreases by less than 5 volume percentage units, preferably by less than 1 volume percentage unit. In one embodiment, after the reduction step, the concentration of $CO_2$ in the sample is at least 85 vol-% while having been preferably at least 90 vol-% initially before the reduction step.

Preferably, after the reduction step, the concentration of $N_2O$ is below 200 ppb.

Preferably, the temperature during the catalytic oxidation of $N_2O$ is in the range of from 200 to 500° C.

The catalytic reaction proceeds more efficiently at high temperatures, such as at temperatures above 300° C., for example above 350° C.

We observed that low flow rates, for example 0.1 to 0.4 l/min (NTP)/gram of catalyst, are preferred during the catalytic reduction of $N_2O$, as $N_2O$ reduction is then more efficient.

The invention also provides a method of optical detection of $^{14}CO_2$, and optionally also $^{14}CH_4$, in a gaseous sample. In the method, $N_2O$ is first removed, and subsequently the concentration of $^{14}CO_2$ is determined by an infrared laser spectroscopic method. The $^{14}CO_2$ may be initially present in the sample or it may have been converted from the $^{14}CH_4$ initially present in the sample, by using for example an additional oxidation step. Such conversion is done before conducting the optical measurement.

Anion Exchange Extraction

In one embodiment, before the optical measurement carbon dioxide, preferably $^{14}CO_2$, is extracted from the gaseous sample, such as an atmospheric sample. Extraction can be performed by trapping the carbon dioxide by means of an anion exchange resin. Preferably the resin is selective in the sense that dinitrogen oxide is not adsorbed the by the resin.

In one embodiment, the anion exchange resin is an amine-based resin. Preferably the resin is an anion exchange resin functionalized with amino groups.

In one embodiment, the anion exchange resin features primary, secondary, and/or tertiary amino groups, e.g. polyethylene amine.

In one embodiment, the anion exchange resin is a cross-linked polystyrene based resin, preferably functionalized with amino groups.

In one embodiment, the anion exchange resin is a polystyrene polymer based resin, which is crosslinked via the use of divinylbenze, and is functionalized with primary amine groups, such as benzylamine. Such a resin can be produced by a phthalimide process, for example by a process that is commercially available from LANXESS Deutschland GmbH under the brand name LEWATIT® VP 001065.

In one embodiment, LEWATIT® VP OC 001065 resin is used. According to literature (Alesi & Kitchin, Ind. Eng. Chem. Res. 2012, 51, 6907-6915) the capture capacity of LEWATIT VP OC 001065 resin is remarkably high; 1.85 to 1.15 mol $CO_2$/kg in a packed bed reactor exposed to 10 vol-% of $CO_2$ at adsorption temperatures ranging from 30 to 70° C.

In one embodiment, the anion exchange resin is a weakly basic purely gel-type resin.

The thermal stability of the resin must be high enough to facilitate fast regeneration. Therefore, the resin preferably comprises crosslinked polymeric material.

In one embodiment, the gaseous sample is flown through a column containing the resin, whereby the $CO_2$ present in the sample becomes adsorbed.

To release the adsorbed $CO_2$, the resin is heated, preferably to a temperature in the range 50 to 100° C. It is advantageous to keep the temperature below 100° C., in order to prevent too large decomposition or other reactions of nitrogen-containing functional groups in the resin that would produce interfering $N_2O$ to the sample. To achieve the highest sensitivity, it is necessary to remove such produced $N_2O$. The removal preferably takes place by the present reduction method after the extraction step.

In one embodiment, substantially all $N_2O$ produced to the sample during the heating and releasing step may be subsequently removed in the catalytic reduction step.

The duration of the heating step is preferably 1 to 15 minutes, more preferably 10 minutes at maximum. A short and fast heating is preferred so that nitrogen-containing functional groups in the resin do not decompose or react and produce interfering $N_2O$ or at least the production of such interfering $N_2O$ is minimized.

In some embodiments, multiple columns, at least two columns, can be arranged in parallel to enable continuous or at least faster sampling. One cycle of trapping a sample, heating the resin, cooling the resin and regenerating the resin typically takes about 30 minutes. By using parallel columns, sampling for example at 5-minute intervals becomes possible.

In some embodiments, it is possible to use a trapping method that extracts both carbon dioxide and $N_2O$ from the sample. Any $N_2O$ that becomes co-extracted with carbon dioxide may be subsequently removed in the catalytic reduction step.

Cryogenic Trapping

In one embodiment, before the optical measurement carbon dioxide is extracted from the gaseous sample, such as an atmospheric sample. Extraction can be performed by trapping the carbon dioxide by means of a cryogenic trap.

When trapping $CO_2$ using the cryogenic trap, any $N_2O$ present in the sample also becomes trapped, because the freezing temperature of $CO_2$ (195 K) is close to the freezing temperature of $N_2O$ (182 K). $N_2O$ absorption lines are present close to the targeted $^{14}CO_2$ absorption line and will thus interfere with the measurement. It is therefore necessary to remove the $N_2O$, either before or after the trapping step, in order to achieve the highest sensitivity.

In one embodiment, $CO_2$ is trapped in a cryogenic trap that is cooled down to below the freezing point of $CO_2$ (195 K), for example to a temperature in the range 150 to 190 K. By heating the trap to a temperature above 195 K, for example to a temperature in the range 200 to 250 K, almost pure $CO_2$ becomes released and can subsequently be analysed by an optical method. However, the trapped $N_2O$ will also be released at the same time. Preferably, water is removed from the sample before leading it to the trap to avoid ice formation and clogging of the trap.

In one embodiment, the method of detecting carbon dioxide in a gaseous sample comprises a gaseous sample filtration step by means of a particle filter, a mass flow controller step, a water removal step to remove from the sample any water vapour that might clog a subsequent cryogenic cooler by forming ice, a carbon dioxide trapping step by means of a cryogenic cooler, a carbon dioxide releasing step by means of a resistive heater configured to heat the cryogenic cooler, a $N_2O$ reduction step by means of a Cu catalyst, and a carbon dioxide determining step by means of a cavity ring-down spectrometer.

Optical Measurement

In some embodiments, the optical detection is based on measuring infrared absorbance of the sample. The preferred wavenumber range is 2200 to 2250 $cm^{-1}$. The preferred absorption line of $CO_2$ for determining the amount of radiocarbon in the form of $^{14}CO_2$ is situated at 2209.1 $cm^{-1}$.

Preferably, the light source is a tunable laser, for example a quantum cascade laser, or an optical parametric oscillator.

In one embodiment, the optical detection method is a cavity ring-down spectroscopic method, and light is detected by an infrared photovoltaic detector at the output of the cavity.

Figure 1B:
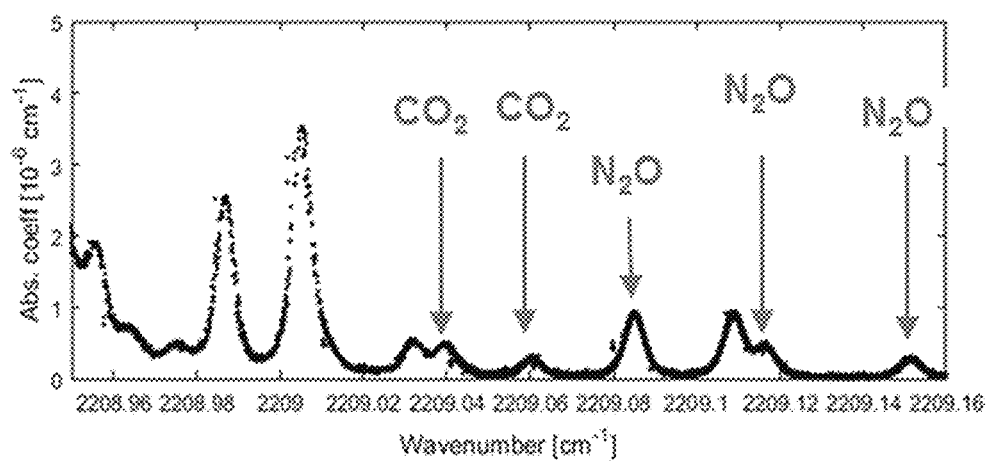
FIG. 1B shows an optical spectrum measured by the apparatus shown in FIG. 1A.

FIG. 1 illustrates schematically a laser spectroscopy apparatus in accordance with at least some embodiments of the present invention. The apparatus comprises a tunable light source 11, a gas cell 12 in the form of a cavity, and a detector 13 at the output of the gas cell. The length L of the gas cell is for example 40 cm. Absorption is measured as a function of wavenumber.

In some embodiments, the spectroscopic set-up described in the publication Genoud et al. (2015) and comprising a cavity ring-down spectrometer, a quantum cascade laser and an infrared photovoltaic detector is used.

Figure 2:
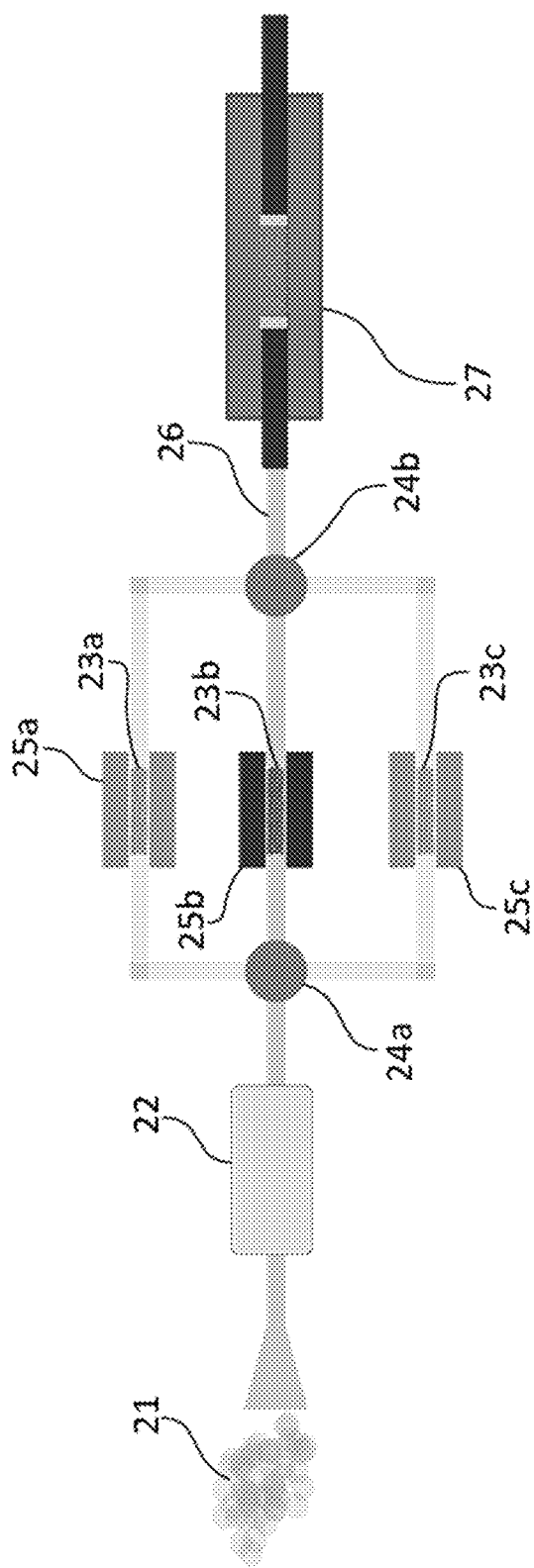
FIG. 2 illustrates schematically a method in accordance with at least some embodiments of the present invention.

FIG. 2 illustrates a method in accordance with an embodiment of the present invention. The air sample 21 is filtrated by a particle filter 22 before leading the sample into anion exchange columns. Three parallel columns 23a, 23b, 23c are used to enable faster sampling. Multiport valves 24a, 24b are controlled so that the filtered air sample gas flow is directed to only one of the three columns at a time. Heaters 25a, 25b, 25c are placed around the columns 23a, 23b, 23c for carrying out release of a concentrated $CO_2$ sample. In this embodiment, after extraction, any remaining $N_2O$ is removed from the concentrated sample 26 by catalytic reduction 27 by using a copper catalyst, without oxygen, to further improve the accuracy of the $CO_2$ determination. Thereafter, the sample is lead to a measurement cell (not shown) comprising high-reflectivity mirrors at both ends and a pressure sensor, and a laser spectroscopic measurement is carried out. The measurement set-up comprises a quantum cascade laser as the light source, mode matching optics, and a photovoltaic detector.

Figure 3:
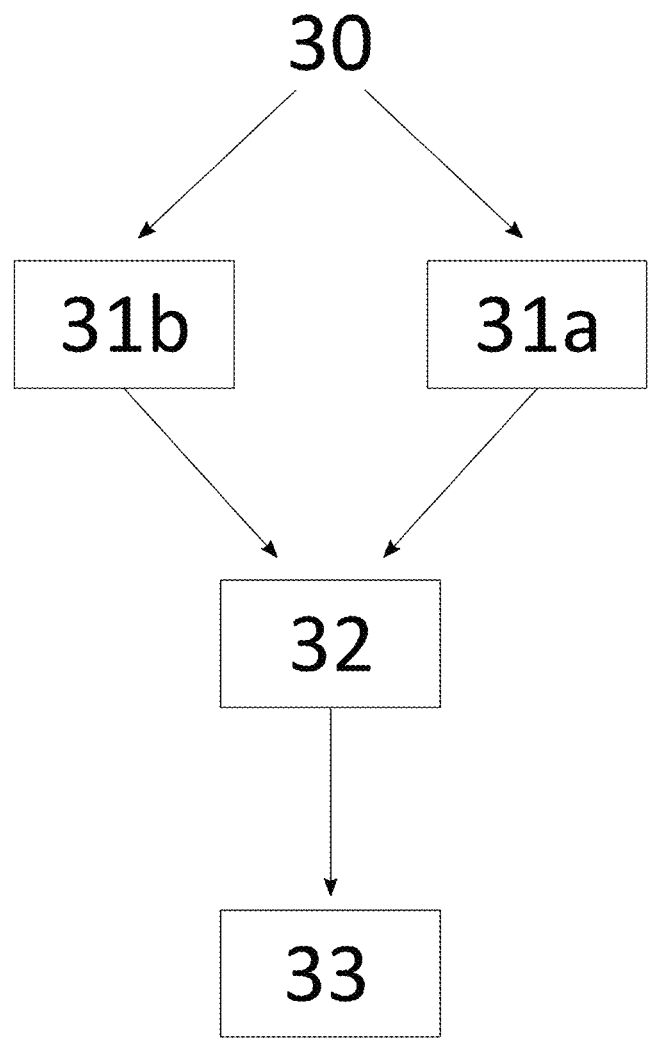
FIG. 3 illustrates, as a block diagram, method steps in accordance with at least some embodiments of the present invention.

FIG. 3 illustrates, as a block diagram, method steps in accordance with at least some embodiments of the present invention. Step 31a, 31b comprises concentrating a gaseous sample 30 to increase the concentration of carbon dioxide, to obtain a concentrated gaseous sample. The concentrating can be realized via the step 31a or the step 31b. In step 31a, the concentrating is carried out by cryogenic trapping. In step 31b, the concentrating is carried out by using an anion exchange resin. From step 31a, 31b the sample is led to step 32, which comprises bringing the concentrated gaseous sample into contact with a catalyst capable of reducing dinitrogen oxide, in order to remove any dinitrogen oxide in the concentrated gaseous sample, to form $N_2$ and $O_2$ as reaction products of the reduction reaction. From step 32, the sample is led to step 33, which comprises determining the amount of an isotopic form of carbon dioxide in the gaseous sample by infrared absorption spectroscopy.

EXAMPLES

In the following we describe experiments conducted and the results obtained according to an embodiment of the present invention. The set-up shown in FIG. 3, but with one resin only instead of three, was used.

Preparation of a copper on activated charcoal catalyst for the decomposition of $N_2O$ A catalyst for the decomposition of $N_2O$ was prepared by impregnation of Cu(II) nitrate solution on dried activated charcoal (NORIT® SA 2) followed by drying and calcination. The copper content of the catalyst was about 9 w-%.

Conversion of $N_2O$

The Cu catalyst is heated to about 400° C. and the sample gas is flown through it. There is no need for supply of any additional gases to carry out the reduction process. As a result, the sample is not diluted upon the conversion. $N_2O$ is converted into $N_2$ and $O_2$, which do not have any interfering absorption lines in the targeted wavelength region.

Spectroscopic Measurements

Instrument

The system consists of mainly two parts: a sampling module to extract $CO_2$ from air, and a laser spectroscopy module to detect trace amounts of $^{14}CO_2$. The optical detection part is based on the cavity ring-down spectroscopy technique as illustrated in FIG. 1. A quantum cascade laser is used as a light source and coupled to a 40-cm-long cavity composed of high reflectivity mirrors (99.98%). Light is detected by a photovoltaic detector at the output of the cavity. By using these components one can achieve a high sensitivity with a compact setup with a footprint of 45 cm×60 cm. The setup is described in more detail in Genoud et al., where it was characterised using pure $CO_2$.

Figure 4:
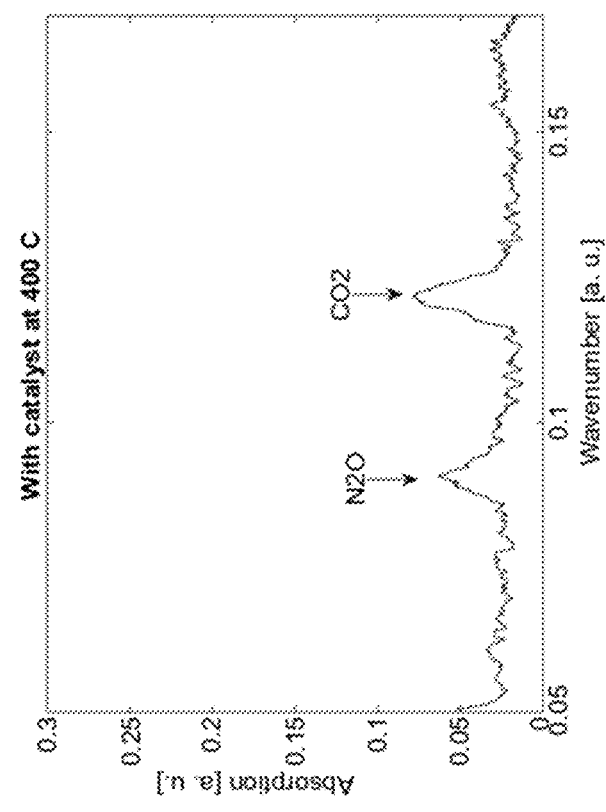
FIG. 4 shows optical spectra measured from gaseous samples in accordance with at least some embodiments of the present invention.
Figure 4:
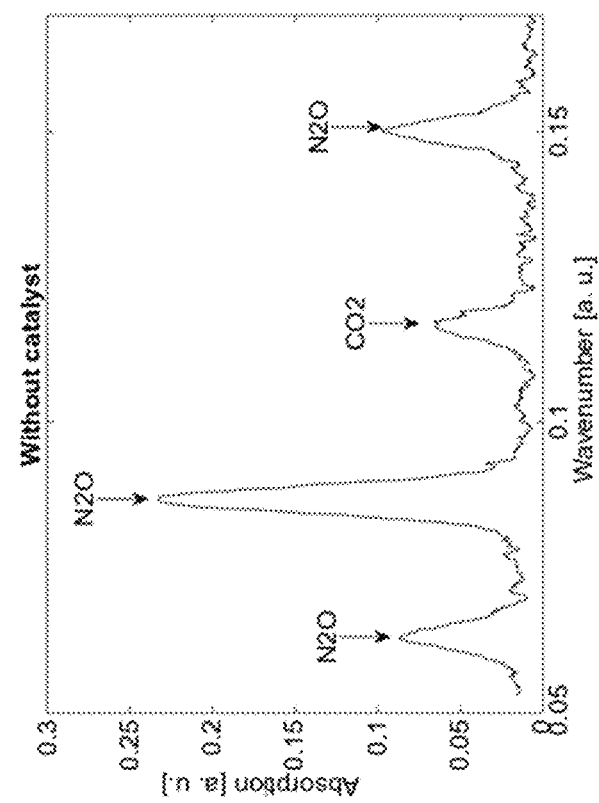

FIG. 4 shows IR absorption spectra measured from gaseous samples treated in accordance with at least some embodiments of the present invention.

The spectrum on the left is measured from a sample from which $N_2O$ was not removed catalytically (titled "without catalyst"). The spectrum on the right is measured from a sample from which $N_2O$ was removed by using a Cu (9%) on activated carbon catalyst by using a temperature of 400° C. (titled "with catalyst at 400 C"). Both graphs show absorption [a.u.] as a function of wavenumber [a.u.].

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

INDUSTRIAL APPLICABILITY

The present invention is industrially applicable at least in the monitoring of gaseous radiocarbon in the form of carbon dioxide and methane in atmospheric samples, as well as emissions from from nuclear power plants or radioactive waste repositories.

REFERENCE SIGNS LIST 11 tunable light source
12 gas cell
13 detector
21 air sample
22 particle filter
23a, 23b, 23c anion exchange columns
24a, 24b multiport valves
25b, 25c heaters
26 concentrated sample
27 catalytic reduction

CITATION LIST

Patent Literature

WO2020065133A1

Non Patent Literature

G. Genoud et al., "Radiocarbon dioxide detection based on cavity ring-down spectroscopy and a quantum cascade laser", Optics Letters 40 (2015) 1342-1345.

McCartt, T. Ognibene, G. Bench, and K. Turteltaub, "Measurements of carbon-14 with cavity ring-down spectroscopy", Nucl. Instr. Meth. Phys. Res. B 361 (2015) 277.

Galli, I.; Bartalini, S.; Borri, S.; Cancio, P.; Mazzotti, D.; De Natale, P.; Giusfredi, G. Phys. Rev. Lett. 2011, 107, 270802.

Galli, I.; Bartalini, S.; Ballerini, R.; Barucci, M.; Cancio, P.; De Pas, M., Giusfredi, G.; Mazzotti, D.; Akikusa, N.; De Natale, P. Optica 2016, 3, 385.

McCartt, A. D.; Ognibene, T. J.; Bench, G.; Turteltaub, K. W. Anal. Chem. 2016, 88, 8714.

Fleisher, A. J.; Long, D. A.; Liu, Q.; Gameson, L.; Hodges, J. T. J. Phys. Chem. Lett. 2017, 8, 4550.

Sonnenschein, V.; Terabayashi, R.; Tomita, H.; Kato, S. Hayashi, N.; Takeda, S.; Jin, L.; Yamanaka, M.; Nishizawa, N.; Sato, A. Yoshida, K.; Iguchi, T. J. Appl. Phys. 2018, 124, 033101.

Hong Meng et al., "Reductive removal of gaseous nitrous oxide by activated carbon with metal oxide catalysts", RSC Adv., 2017, 7, 10407.

S. Kannan, "Decomposition of nitrous oxide over the catalysts derived from hydrotalcite-like compounds", Applied Clay Science 13 (1998) 347-362.

M. Konsolakis, "Recent Advances on Nitrous Oxide ($N_2O$) Decomposition over Non-Noble-Metal Oxide Catalysts: Catalytic Performance, Mechanistic Considerations, and Surface Chemistry Aspects", ACS Catal. 2015, 5, 6397-6421.

G. Genoud et al., "Laser Spectroscopy for Monitoring of Radiocarbon in Atmospheric Samples", Anal. Chem. 2019, 91, 12315-12320.

The invention claimed is:

1. A method of selectively catalytically reducing dinitrogen oxide present in a gaseous sample, wherein the gaseous sample also comprises carbon dioxide, the method characterized in that it comprises:
   concentrating the gaseous sample to increase the concentration of an isotopic form of carbon dioxide, to obtain a concentrated gaseous sample;
   providing a catalyst capable of reducing dinitrogen oxide;
   bringing the concentrated gaseous sample into contact with the catalyst, in a reduction step, without any addition or feed of external gases, to reduce dinitrogen oxide in the gaseous sample in the presence of the catalyst;

wherein as a result of the reduction step, the concentrated gaseous sample is adapted for determination of the amount of the isotopic form of $CO_2$ in the gaseous sample.

2. The method according to claim 1, wherein the catalyst is not capable of reducing said carbon dioxide.

3. The method according to claim 1, wherein the catalyst is a heterogeneous Cu catalyst or a heterogeneous calcined hydrotalcite catalyst, and wherein the catalyst is heated to a temperature of at least 200° C.

4. The method according to claim 1, wherein, prior to the reduction step, the gaseous sample comprises at least 90 vol-% carbon dioxide.

5. A method of extracting carbon dioxide from a gaseous sample, the method comprising:
concentrating the gaseous sample to increase the concentration of carbon dioxide, to obtain a concentrated gaseous sample; and thereafter
bringing the concentrated gaseous sample into contact with a catalyst capable of reducing dinitrogen oxide, in a reduction step, without any addition or feed of external gases, in order to remove any dinitrogen oxide in the concentrated gaseous sample, to form $N_2$ and $O_2$ as reaction products of the reduction reaction.

6. A method of detecting carbon dioxide in a gaseous sample comprising at least carbon dioxide and $N_2O$, the method comprising:
catalytically reducing the dinitrogen oxide present in the gaseous sample, without any addition or feed of external gases; and subsequently,
determining the amount of an isotopic form of carbon dioxide in the gaseous sample by infrared absorption spectroscopy,
the method further comprising before the reduction step:
concentrating the gaseous sample to increase the concentration of the isotopic form of carbon dioxide to be determined.

7. The method according to claim 6, the method further comprising before the reduction step:
concentrating the gaseous sample to increase the concentration of the isotopic form of carbon dioxide to be determined, to obtain a concentrated gaseous sample, wherein the concentrated gaseous sample comprises at least 90 vol-% carbon dioxide.

8. The method according to claim 6, wherein, before the determining step:
leading the gaseous sample to a cryogenic trap which has been cooled to a temperature below 195 K, whereby the carbon dioxide present in the gaseous sample solidifies and becomes trapped;
releasing the trapped carbon dioxide by heating the cryogenic trap to a temperature above 195 K;
whereby as a result the concentrated gaseous sample is obtained.

9. The method according to claim 6, wherein, before the determining step:
flowing the gaseous sample through an anion exchange resin to selectively adsorb $CO_2$ present in the gaseous sample;
releasing the adsorbed $CO_2$ from the resin;
wherein as a result the concentrated gaseous sample is obtained.

10. The method according to claim 7, wherein said reduction step is carried out on said concentrated gaseous sample, and wherein the isotopic form is $^{14}CO_2$.

11. An apparatus comprising in a cascade:
first means for catalytically reducing dinitrogen oxide present in a gaseous sample that also comprises carbon dioxide; and
second means for determining the amount of an isotopic form of $CO_2$ present in the gaseous sample by infrared absorption spectroscopy,
wherein the apparatus is characterized in that the apparatus further comprises:
upstream of said first means, extraction means for concentrating the gaseous sample to increase the concentration of carbon dioxide containing the isotopic compounds to be determined.

12. The apparatus according to claim 11, wherein the first means for catalytically reducing dinitrogen oxide present in the gaseous sample comprises a first catalyst bed comprising a Cu catalyst.

13. The apparatus according to claim 11, wherein the extraction means comprises an anion exchange resin that is capable of selectively adsorbing $CO_2$ present in the gaseous sample, and wherein the anion exchange resin comprises primary, secondary, and/or tertiary amino groups.

14. A method of detecting carbon dioxide in a gaseous sample comprising at least carbon dioxide and $N_2O$, the method comprising:
catalytically reducing the dinitrogen oxide present in the gaseous sample; and subsequently,
determining the amount of an isotopic form of carbon dioxide in the gaseous sample by infrared absorption spectroscopy,
the method further comprising before the reducing:
concentrating the gaseous sample to increase the concentration of the isotopic form of carbon dioxide to be determined,
the method further comprising before the determining:
flowing the gaseous sample through an anion exchange resin to selectively adsorb $CO_2$ present in the gaseous sample;
releasing the adsorbed $CO_2$ from the resin.

* * * * *